(12) United States Patent
Solhusvik

(10) Patent No.: US 11,451,717 B2
(45) Date of Patent: Sep. 20, 2022

(54) MULTI-CELL PIXEL ARRAY FOR HIGH DYNAMIC RANGE IMAGE SENSORS

(71) Applicant: OMNIVISION TECHNOLOGIES, INC., Santa Clara, CA (US)

(72) Inventor: Johannes Solhusvik, Haslum (NO)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 16/674,964

(22) Filed: Nov. 5, 2019

(65) Prior Publication Data

US 2021/0136275 A1      May 6, 2021

(51) Int. Cl.
*H04N 5/235*      (2006.01)
*H04N 5/3745*     (2011.01)
*H04N 5/353*      (2011.01)
*H04N 5/355*      (2011.01)

(52) U.S. Cl.
CPC ........... *H04N 5/2355* (2013.01); *H04N 5/355* (2013.01); *H04N 5/3535* (2013.01); *H04N 5/37452* (2013.01)

(58) Field of Classification Search
None
See application file for complete search history.

(56) References Cited

U.S. PATENT DOCUMENTS

| | | | |
|---|---|---|---|
| 10,334,191 B1 * | 6/2019 | Yang | H01L 27/14612 |
| 2014/0320718 A1 * | 10/2014 | Fan | H01L 27/14638 348/308 |
| 2016/0360134 A1 * | 12/2016 | Miyake | H01L 27/14636 |
| 2017/0324917 A1 * | 11/2017 | Mlinar | H04N 5/369 |
| 2017/0347047 A1 * | 11/2017 | Mao | H04N 5/23229 |

\* cited by examiner

*Primary Examiner* — Mark T Monk
(74) *Attorney, Agent, or Firm* — Christensen O'Connor Johnson Kindness PLLC

(57) ABSTRACT

A pixel includes an array of a plurality of photodiodes. The array of photodiodes includes a plurality of rows of photodiodes and a plurality of columns of photodiodes. The plurality of photodiodes includes a set of first photodiodes that has a first surface area and at least one second photodiode that has a second surface area that is smaller than the first surface area. The first photodiodes are arranged to be symmetric with respect to the at least one second photodiode. Output circuitry is electrically coupled to each of the first photodiodes in the set of first photodiodes. A switch is selectively, operably closed to electrically couple the output circuitry to the second photodiode.

24 Claims, 7 Drawing Sheets

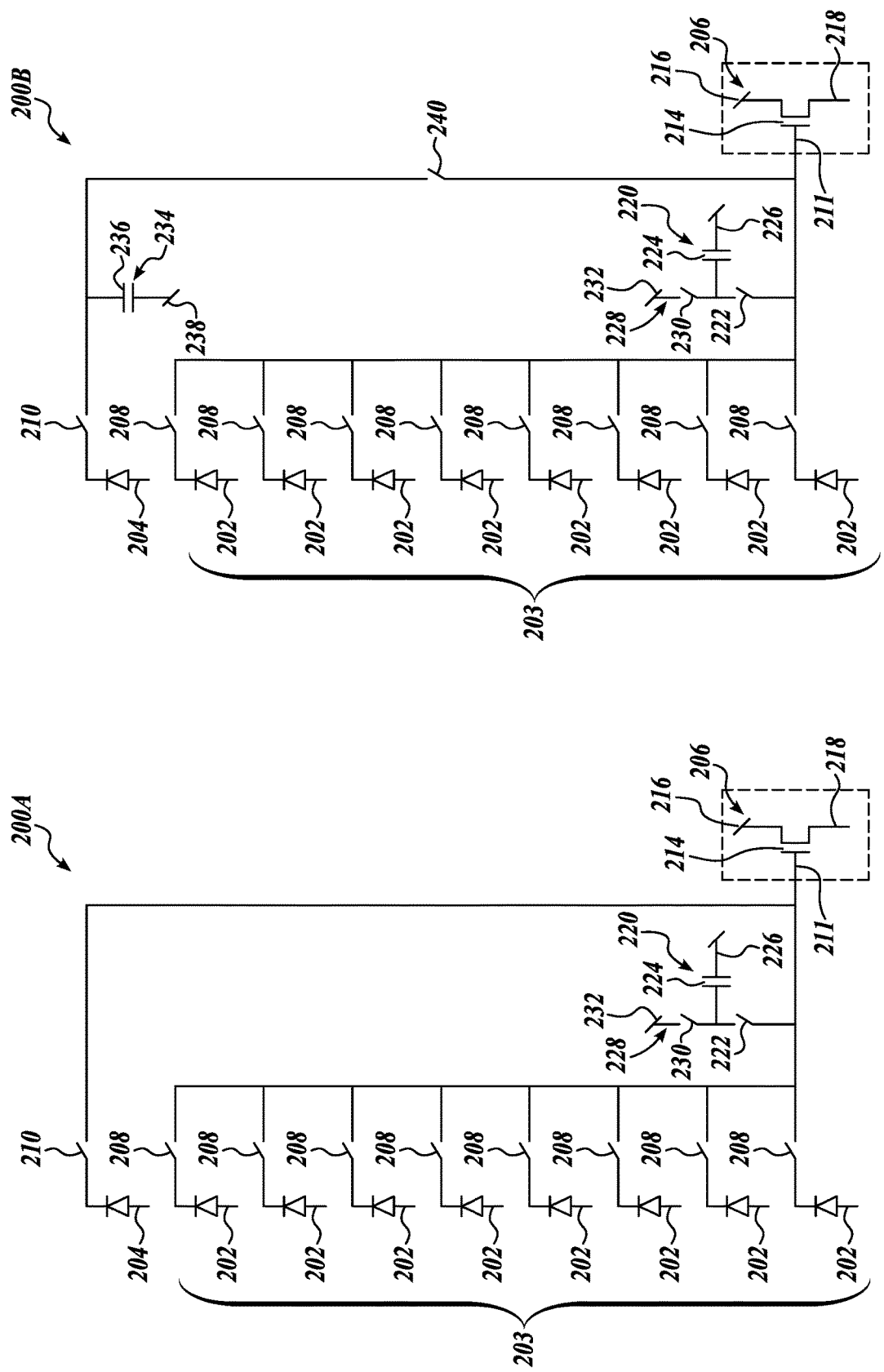

MULTI-CELL PIXEL ARRAY FOR HIGH DYNAMIC RANGE IMAGE SENSORS

BACKGROUND INFORMATION

Field of Disclosure

The present invention is generally related to image sensors, and more specifically, is directed to high dynamic range image sensors.

Background

Standard image sensors have a limited dynamic range of approximately 60 to 70 dB. However, the luminance dynamic range of the real world is much larger. For instance, natural scenes often span a range of 90 dB and greater. To capture details in bright lights and dim shadows simultaneously, high dynamic range (HDR) technologies have been used in image sensors to increase the captured dynamic range. The most common technique to increase dynamic range is to merge multiple exposures captured with different exposure settings using standard (low dynamic range) image sensors into a single linear HDR image, which results in a much larger dynamic range image than a single exposure image.

Another HDR technique incorporates different exposure integration times or different light sensitivities (for example by inserting neutral density filters) into a single image sensor. The single image sensor could have in effect 2, 3, 4, or even more different exposures in the single image sensor. Thus, multiple exposure images are available in a single shot using this HDR image sensor. However, the overall image resolution is decreased using this HDR sensor compared to a normal full resolution image sensor. For example, for an HDR sensor that combines 4 different exposures into one image sensor, each HDR image would be only a quarter resolution of the full resolution image.

Other approaches to implement HDR image sensors present many other challenges. These other approaches are not space efficient and are difficult to miniaturize to a smaller pitch to achieve higher resolutions. In addition, due to the asymmetric layouts of many of these HDR image sensors, reducing the size and pitch of the pixels to realize high resolution image sensors result in crosstalk and other unwanted side effects, such as diagonal flare that can occur in these image sensors as the pitches are reduced. Furthermore, many HDR image sensors require structures with very large full well capacities (FWC) to accommodate the large dynamic ranges. However, the large FWC requirements cause lag, white pixels (WP), dark current (DC), and other unwanted problems. Thus, these other HDR imaging approaches are also not suitable for high resolutions because of the high FWC requirements that are difficult to scale.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

FIG. 2A is an illustrative schematic of an example pixel that includes multiple photodiodes, including multiple large photodiodes and at least one small photodiode, in accordance with the teachings of the present invention.

FIG. 2B is an illustrative schematic of an example pixel that includes multiple photodiodes along with a lateral overflow integration capacitor (LOFIC) in accordance with the teachings of the present invention.

Figure 1:
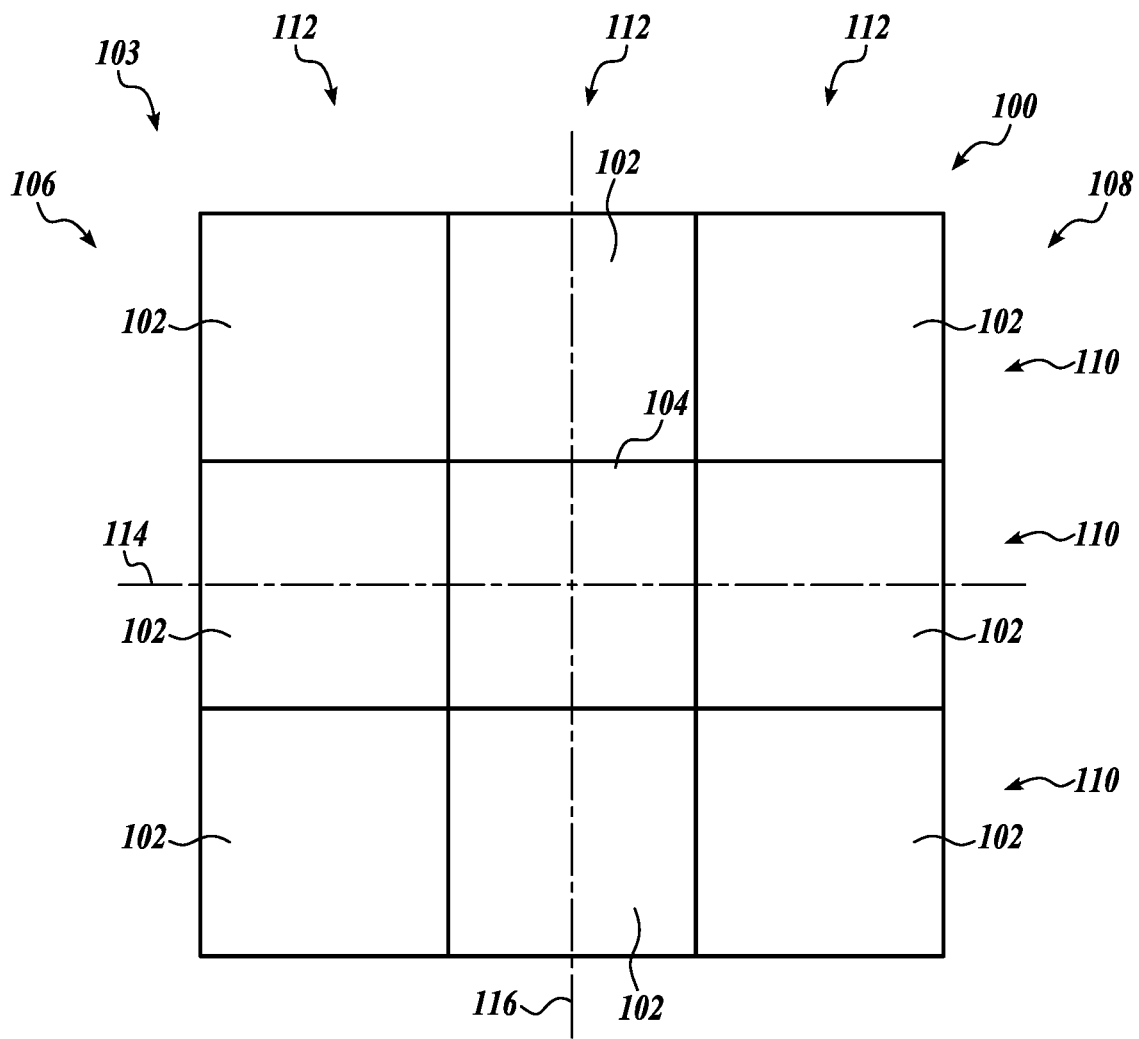
FIG. 1 is a layout view of an exemplary pixel that includes multiple large photodiodes that are arranged around a small photodiode in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well understood elements that are useful or necessary in a commercially feasible embodiment are often not depicted in order to facilitate a less obstructed view of these various embodiments of the present invention.

DETAILED DESCRIPTION

Methods and apparatuses directed to a pixel array with multiple photodiodes, including a plurality of large photodiodes that are arranged symmetrically around at least one small photodiode, are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

FIG. 1 illustrates an exemplary pixel 100 that includes multiple photodiodes. A plurality of first photodiodes 102 collectively form a large photodiode 103. The plurality of first photodiodes 102 may be arranged around a second photodiode, that forms a small photodiode 104, in accordance with the teachings of the present invention. Each of the individual first photodiodes 102 may be substantially the same size (e.g., have substantially the same surface area) as the small photodiode 104. The multiple first photodiodes 102 and the small photodiode 104 may be arranged along the surface 106 of an imaging sensor and may be positioned to receive light that is incident on the imaging sensor surface 106. The first photodiodes 102 and the small photodiode 104 may be n-type pinned photodiodes. Each first photodiode 102 may be adapted to photogenerate image charge (e.g., a charge of e⁻) in response to incident light. Such image charge may generate a corresponding electrical signal in which the strength of the electrical signal may be based upon the amount of image charge generated as a result of the light incident on the large photodiode 104. Likewise, the small photodiode 104 may photogenerate image charge as a result of the light that is incident on the small photodiode 104. Such image charge may result in an electrical signal being generated by the small photodiode 104 in which the strength of the electrical signal may be based upon the amount of image charge generated as a result of the light incident on the small photodiode 104. The electrical signals generated by the first photodiodes 102 and the small photodiode 104 may be used to generate image data. The surface 106 of the imaging sensor may include a plurality of exemplary pixels 100. The collection of image data generated from such a plurality of pixels 100 arranged along the surface 106 of the imaging sensor may be used to render an image.

The surface area of the first photodiodes 102 that collectively form the large photodiode 103 arranged along the surface 106 of the imaging sensor to receive incident light may be larger than the corresponding surface area of the small photodiode 104 that is arranged along the surface 106 of the imaging sensor. In some instances, for example, the pitch of each first photodiode 102 may be approximately 1 μm. In some implementations, the pitch of one or more of the first photodiodes 102 may be approximately 0.9 μm and/or 0.7 μm. In some implementations, the pitch of each of the first photodiodes 102 in the pixel 100 may be the same. The pitch of the small photodiode 104 may be the same as, or substantially the same as, the pitches of each of the corresponding first photodiodes 102 in the pixel 100.

The amount of the image charge generated from a photodiode, such as the large photodiode 103 and/or the small photodiode 104, may be based, at least in part, on the surface area of the photodiode that is arranged to receive incident light. For example, the strength of the electrical signal may be proportional to and thereby increase as the amount of surface area that is positioned to receive incident light increases. In such an implementation, the first photodiodes 102 that collectively form the large photodiode 103 may therefore generate a relatively stronger electrical signal collectively in comparison to the electrical signal generated by the small photodiode 104 that receives that same intensity of incident light. As such, the large photodiode 103 may be used to sense dimmer low to medium intensity light conditions, whereas the relatively smaller small photodiode 104 may be used to sense bright or high intensity light conditions. In some implementations, the small photodiode 104 may also be used to capture flickers from light emitting diodes (e.g., LED flickers) that may otherwise be missed by the large photodiode 103. For instance, in one example, the exposure time of the small photodiode 104 to the incident light may be increased relative to the exposure time of the large photodiode 103 to capture LED flickers (e.g., ~11 ms interval). The capture of such LED flickers may be useful in various situations, such as, for example, when the exemplary pixel 100 is used as part of image sensor that is used in a vehicle to render images of and detect objects in the surrounding environment. The array of first photodiodes 102 and small photodiode 104 may be used to provide the pixel 100 with an image output having a high dynamic range (HDR). The amount of image charge generated from a photodiode may also depend on other factors, including, for example, the effective length of the photodiode. Photodiodes having a relatively deeper effective length may generate more image charge than a similar photodiode with a relatively shallower effective length.

The multiple first photodiodes 102 that form large photodiode 103 and the small photodiode 104 may collectively form an array 108 of photodiodes as part of the pixel 100. The array 108 of photodiodes may include a plurality of rows 110 and/or a plurality of columns 112 of photodiodes. Each of the rows 110 and/or columns 112 may include a plurality of photodiodes. As shown in FIG. 1, for example, each row 110 includes a set of three photodiodes, and each column 112 also includes a set of three photodiodes. The first photodiodes 102 may be arranged to be symmetric with respect to the small photodiode 104 with respect to one or more axes of symmetry. For example, as shown in FIG. 1, the first photodiodes 102 may be arranged around the small photodiode 104 to be symmetric with respect to a first axis of symmetry 114 and with respect to a second axis of symmetry 116. Such a symmetric arrangement of the first photodiodes 102 with respect to the small photodiode 104 may be used to reduce the glare that may result from light that is incident at an angle (e.g., 45°) on the surface 106 of the imaging sensor. In some implementations, the pixel 100 may include a plurality of small photodiodes 104 and a plurality of first photodiodes 102. In such an implementation, the plurality of first photodiodes 102 may be arranged to be symmetric with respect to one or more of the plurality of small photodiodes 104.

FIG. 2A illustrates a schematic of an exemplary pixel 200A that includes multiple first photodiodes 202 that collectively form a large photodiode 203 and at least one small photodiode 204. Each of the first photodiodes 202 may be selectively, electrically coupled to output circuitry 206 using one or more first transfer switches 208. Such first transfer switches 208 may be implemented using, for example, NMOS transistors. In some implementations, one or more of the first transfer switches 208 may be controlled to selectively move between an open state and a closed state using control circuitry (see, e.g., FIG. 3). One or more of the first transfer switches 208 may be closed, for example, to provide an electrical pathway for the image charges generated at each of the corresponding first photodiodes 202 in response to incident light on the first photodiodes 202. Such an electrical pathway may extend between one or more of the first photodiodes 202 and the output circuitry 206, for example.

A second transfer switch 210 (one shown in FIG. 2A) may be used to selectively, electrically couple corresponding small photodiode 204 (one shown in FIG. 2A) to the output circuitry 206. Second transfer switch 210 may be implemented using, for example, an NMOS transistor. The second transfer switch 210 may be controlled to selectively move between an open state and a closed state using control circuitry (see, e.g., FIG. 3). The second transfer switch 210 may be closed, for example, to provide an electrical pathway for the image charges generated at the small photodiode 204 in response to incident light on small photodiode 204. Such an electrical pathway may extend between the small photodiode 204 and the output circuitry 206, for example.

Output circuitry 206 may be selectively electrically coupled to the first photodiodes 202 as well as to the small photodiodes 204. As shown in the example illustrated in FIG. 2A, the output circuitry 206 may include a source follower transistor 214, a voltage source 216, and an output node 218. In the depicted example, a floating diffusion node 211 is an input node of the output circuitry 206, which is coupled to the gate terminal of the source follower transistor 214. The output node 218 of the output circuitry 206 is coupled to the source terminal of the source follower transistor 214. In the example, the floating diffusion node 211 is coupled to receive the image charge from the first photodiodes 202 and/or the small photodiodes 204 through the first transfer switches 208 and/or the second transfer switches 210, respectively. In such a situation, the output signal generated at the output node 218 by the source follower transistor 214 is responsive to the charge present in the floating diffusion node 211 that is coupled to the gate terminal of the source follower transistor 214.

For instance, during operation of the depicted example, the source follower transistor 214 serves as a buffer or amplifier responsive to the charge in the floating diffusion node 211, and the voltage of the output signal generated at the source terminal of the source follower transistor 214 follows the voltage at the floating diffusion node 211 that is coupled to the gate terminal of the source follower transistor 214, minus the gate source voltage between the gate terminal and the source terminal of the source follower transistor 214. Thus, the resulting voltage at the output node 218 may be used to generate image data that is associated with the exemplary pixel 200A.

In some instances, the set of first transfer switches 208 may be controlled to act together, so that all of the first transfer switches 208 transition together between an open state and a closed state. Controlling first transfer switches 208 collectively may result in the exemplary pixel 200A having lower resolution because the image charge generated at each of the first photodiodes 202 will be transmitted to the floating diffusion node 211 that is coupled to the gate terminal of the source follower transistor 214. The resolution of the exemplary pixel 200A may be increased by selectively closing each of the first transfer switches 208 independently of each other. The control circuitry may control the first transfer switches 208 to limit the amount of image charge generated at the first photodiodes 202 that may then travel to the output circuitry 206. For example, the control circuit may control the first transfer switches 208 to perform a Very Short Exposure ("VS Exposure") in certain conditions, such as when an intense light is incident on the exemplary pixel 200A. Limiting the amount of exposure time may be used to increase the dynamic range of the exemplary pixel 200A.

In the depicted example, pixel 200A also includes dual conversion gain circuitry 220 and reset circuitry 228. The dual conversion gain circuitry 220 may include a dual floating diffusion (DFD) switch 222 and a capacitor 224. The dual conversion gain circuitry 220 may be used by pixel 200A to realize high dynamic range (HDR) imaging. In operation, in bright outdoor lighting conditions, the DFD switch 222 may be closed to couple capacitor 224 to the floating diffusion node 211 to increase the floating well capacity (FWC), which provides additional dynamic range capabilities to pixel 200A. As such, low conversion gain (LCG) is realized by coupling capacitor 224 to the floating diffusion node 211 to accommodate the amount of charge generated during bright light conditions. In an example with dim lighting conditions, the DFD switch may be opened, which decouples the capacitor 224 from the floating diffusion node 211. As such, high conversion gain (HCG) is realized by decoupling the capacitor 224 as the FWC of the floating diffusion node 211 is sufficiently large without adding the capacitor 224. In one example, a voltage source 226 may be electrically coupled to the side of the capacitor 224 opposite the DFD switch 222. The voltage source 226 may thereby be used to enable the storage of at least some of image charge generated by the large photodiodes 202 when the DFD switch 222 is in a closed state.

The reset circuitry 228 may include a reset switch 230 and a voltage source 232. The reset switch 230 may be selectively closed along with DFD switch 222 by the control circuitry (not shown) to create an electrical path to the voltage source 232. In a reset operation, all of the switches in the exemplary pixel 200A—including each of the first transfer switches 208, second transfer switch 210, DFD switch 222, and reset switch 230—may be set into the closed state to provide an electrical pathway between each of the first photodiodes 202, the small photodiode 204, and the floating diffusion node 211 to the voltage source 232 in the reset circuitry 228. In this reset operation, the image charge generated by each of the first photodiodes 202, the small photodiode 204, and the image charge present in the floating diffusion node 211 may be swept to the voltage source 232 to reset the exemplary pixel 200A.

FIG. 2B illustrates a schematic of an exemplary pixel 200B that includes multiple first photodiodes 202 that may collectively form a large photodiode 203, at least one small photodiode 204, output circuitry 206, dual conversion gain circuitry 220, and reset circuitry 228 like exemplary pixel 200A. Exemplary pixel 200B further includes LOFIC circuitry 234 that may comprise a lateral overflow integration capacitor 236 and a voltage source 238. The LOFIC circuitry 234 may be electrically coupled to the small photodiode 204 when the second transfer switch 210 is in a closed state. In instances in which the exemplary pixel 200B has multiple small photodiodes 204, each of the small photodiodes 204 may have an associated LOFIC circuitry 234 to which the small photodiode 204 may be electrically coupled. In other instances, multiple small photodiodes 204 may be selectively electrically coupled to a single LOFIC circuitry 234.

The voltage source 238 may be electrically coupled to the side of the lateral overflow integration capacitor 236 that is opposite the side of the lateral overflow integration capacitor 236 that may be electrically coupled to the small photodiode 204. As such, the voltage source 238 may be used to apply an electric potential to the lateral overflow integration capacitor 236 to thereby attract at least some of the image charge photogenerated by the small photodiode 204 when the lateral overflow integration capacitor 236 is electrically coupled to the small photodiode 204. The lateral overflow integration capacitor 236 may be used, for example, to increase the amount of image charge that may be generated at the small photodiode 204. As such, the lateral overflow integration capacitor 236 may be used to extend the dynamic range of the exemplary pixel 200B by reducing the amount of image charge that is transferred to the output circuitry 206. In some instances, the lateral overflow integration capacitor 236 may be comprised of a large in-metal capacitor. In some instances, the lateral overflow integration capacitor 236 may be comprised of a metal stacked capacitor. In some instances, the lateral overflow integration capacitor 236 may be comprised of a metal-to-metal capacitor, such as one or more of a metal-oxide-metal capacitor and/or a metal-insulator-metal capacitor.

The exemplary pixel 200B may include a small photodiode enable switch 240 that may be positioned between the small photodiode 204 and the output circuitry 206. The small photodiode enable switch 240 may be used to selectively electrically couple the small photodiode 204 with the output circuitry 206 and/or the reset circuitry 228. When the exemplary pixel 200B is being used to capture image charge to generate image data, for example, the small photodiode enable switch 240 may be selectively closed such that the small photodiode 204 may be electrically coupled with the output circuitry 206, thereby allowing image charges to flow from the small photodiode 204 to the floating diffusion node 211 coupled to the output circuitry 206. The small photodiode enable switch 240 may also be selectively closed, along with DFD switch 222 and reset switch 230, during a reset operation so that the small photodiode 204 and the LOFIC circuitry 234 may be electrically coupled to the voltage source 232. In this situation, the image charges present at the small photodiode 204 and/or the LOFIC circuitry 234 may be swept up by the voltage source 232. In such implementations, the small photodiode enable switch 240 may be controlled by the control circuitry (not shown).

Figure 2C:
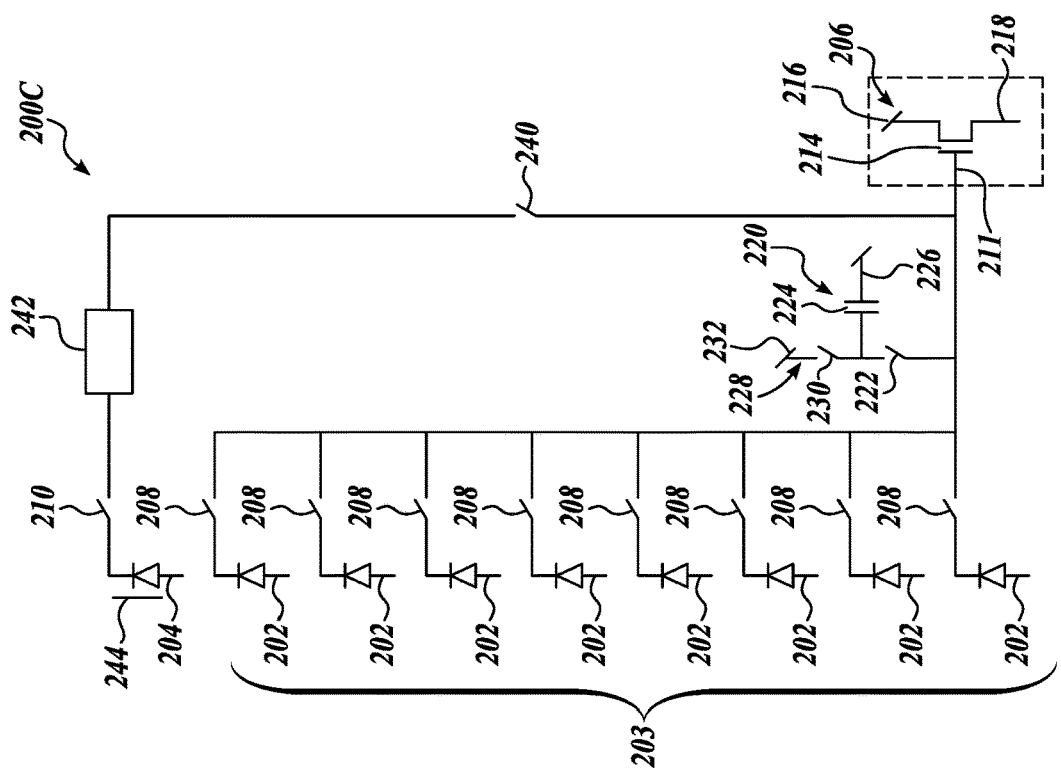
FIG. 2C is an illustrative schematic of an example pixel that includes multiple photodiodes along with a filter that may be used to selectively remove electrical signals associated with light of a desired wavelength and/or band of wavelengths in accordance with the teachings of the present invention.

FIG. 2C illustrates a schematic of an exemplary pixel 200C that includes multiple first photodiodes 202 that collectively form a large photodiode 203, at least one small photodiode 204, output circuitry 206, dual conversion gain circuitry 220, and reset circuitry 228 like exemplary pixel 200A. The exemplary pixel 200C also includes a filter 242 that may be electrically coupled to the small photodiode 204 when the second transfer switch 210 is in a closed state. The filter 242 may selectively filter image charge generated by light of a desired wavelength or within a desired range of wavelengths that is incident on the small photodiode 204. As such, the filter 242 may, for example, operate as band-stop filter that selectively filters light within a given range of wavelengths.

The filter 242 may thereby be used to increase the dynamic range of the exemplary pixel 200C. Further, the range of wavelengths that the filter 242 filters may have an impact on the dynamic range of the exemplary pixel 200C. For example, in some implementations, the filter 242 may filter image charge photogenerated at the small photodiode 204 by light having a wavelength that falls within a wavelength range associated with a certain color. Such selective filtering by the filter 242 may be used to increase the dynamic range of the exemplary pixel 200C. For example, the filter 242 may selectively filter image charge photogenerated at the small photodiode 204 by the portion of the incident light having a wavelength that falls within the wavelength range of green light (e.g., about 520-560 nm). This type of filter that filters image charge associated with green light may increase the dynamic range of the exemplary circuitry 200C because the visual perception of the human eye is particularly sensitive to green light. The filter 242 may filter image charge generated at the small photodiode 204 by light at wavelengths other than green light.

In some implementations, the exemplary pixel 200C may include an optical filter 244 instead of or in addition to filter 242. The optical filter 244 may be a filter located proximate the small photodiode 204 and positioned between the small photodiode 204 and the outside environment. As such, light that is incident on the small photodiode 204 may travel along an optical path such that it passes through the optical filter 244. In this situation, the optical filter 244 may filter a portion of the light incident on the small photodiode that has a wavelength falling within a range of wavelengths. For example, in some implementations, the optical filter 244 may filter light having a wavelength that falls within a wavelength range associated with a certain color. Such selective filtering by the optical filter 244 may be used to increase the dynamic range of the exemplary pixel 200C. For example, the optical filter 244 may selectively filter the portion of the incident light having a wavelength that falls within the wavelength range of green light (e.g., about 520-560 nm). The optical filter 244 may thereby increase the dynamic range of the exemplary circuitry 200C because the visual perception of the human eye is particularly sensitive to green light. The optical filter 244 may filter light incident on the small photodiode at wavelengths other than green light. In one example, one or more optical filters 244 may also be located proximate to one or more of the first photodiodes 202 and positioned between the first photodiodes 202 and the outside environment. As such, light that is incident on the first photodiodes 202 may travel along an optical path such that it passes through the optical filter 244 to the first photodiodes 202. In this situation, the optical filters 244 may filter a portion of the light incident on the first photodiodes that has a wavelength falling within a range of wavelengths. In some instances, the range of wavelengths filtered by the optical filters 244 located proximate to the first photodiodes 202 may be identical to the range of wavelengths filtered by the optical filter 244 located proximate to the small photodiode 204. In other instances, the range of wavelengths filtered by the optical filters 244 located proximate to the first photodiodes 202 may be different than the range of wavelengths filtered by the optical filter 244 located proximate to the small photodiode 204.

Figure 3:
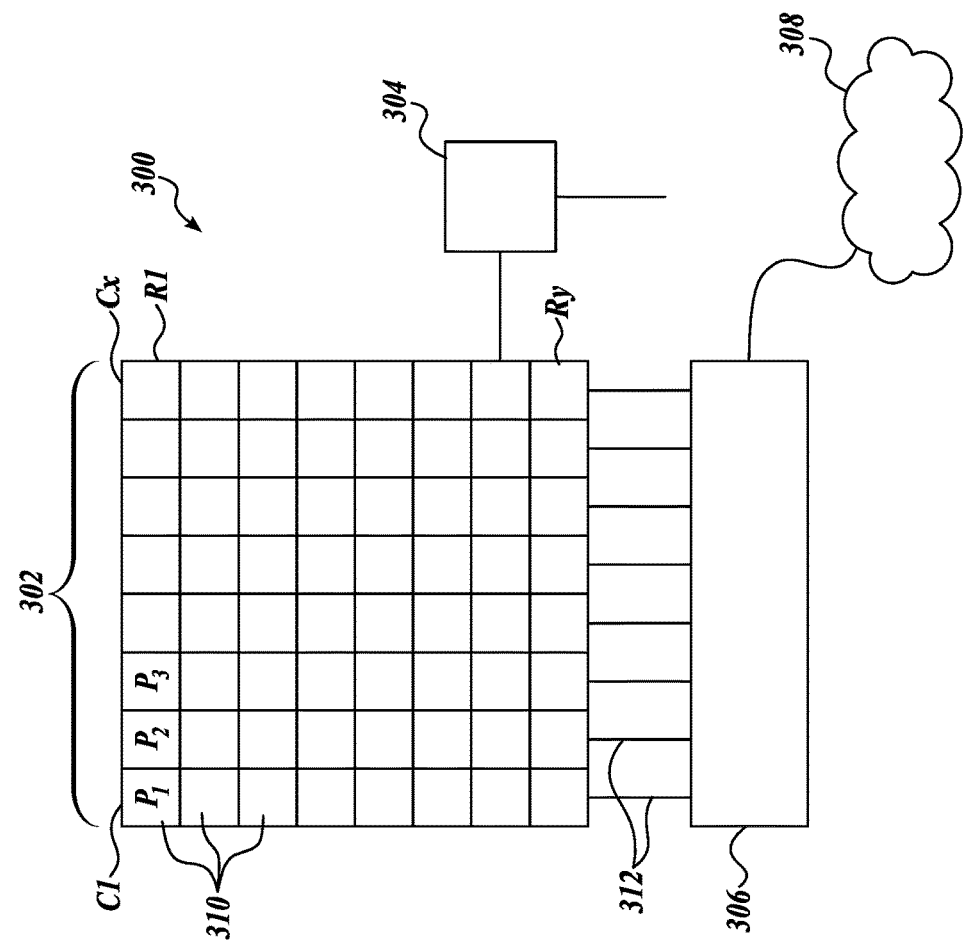
FIG. 3 is a block diagram that shows an imaging system the includes an array of pixels in accordance with the teachings of the present invention.

FIG. 3 shows an imaging system 300 that includes a pixel array 302, control circuitry 304, and readout circuitry 306. The readout circuitry 306 may be communicatively coupled to function logic 308.

The illustrated embodiment of pixel array 302 is a two-dimensional ("2D") array of imaging sensors or pixel cells 310 (e.g., pixel cells P1, P2, . . . , Pn). In one example, each pixel cell 310 includes one or more first photodiodes along with one or more small photodiodes that can be used for HDR imaging in accordance with the teachings of the present invention. As illustrated, the array of pixel cells 310 is arranged into a plurality of rows (e.g., rows R1 to Ry) and a plurality of columns (e.g., columns C1 to Cx) to acquire image data of a person, place, or object, etc., which can then be used to render an image of the person, place, or object, etc. As will be described in greater detail below, each pixel cell 310 (e.g., pixel cells P1, P2, . . . , Pn) may include one or more first photodiodes along with one or more small photodiodes to provide HDR imaging in accordance with the teachings of the present invention.

In one example, after each pixel cell 310 has acquired its image data or image charge, the image data is read out by readout circuitry 306 through readout column bit lines 312 and then transferred to function logic 308. In various examples, readout circuitry 306 may include amplification circuitry (not illustrated), a column readout circuit that includes analog-to-digital conversion (ADC) circuitry, or otherwise. Function logic 308 may simply store the image data or even manipulate the image data by applying post image effects (e.g., crop, rotate, remove red eye, adjust brightness, adjust contrast, or otherwise). In one example, readout circuitry 306 may read out a row of image data at a time along readout column lines (illustrated) or may read out the image data using a variety of other techniques (not illustrated), such as a serial read out or a full parallel read out of all pixels simultaneously.

In one example, control circuitry 306 is coupled to pixel array 302 to control operational characteristics of the pixels 310 (e.g., pixel cells P1, P2, . . . , Pn) in the pixel array 302. For instance, the control circuitry 308 may generate the transfer gate signals and other control signals to control the transfer and readout of image data from the first photodiode(s) and/or small photodiode(s) of each pixel cell 310 of pixel array 302. In addition, control circuitry 308 may generate a shutter signal for controlling image acquisition. In one example, the shutter signal is a global shutter signal for simultaneously enabling all pixels 310 within pixel array 302 to simultaneously capture their respective image data during a single acquisition window. In another example, the shutter signal is a rolling shutter signal such that each row, column, or group of pixels 310 is sequentially enabled during consecutive acquisition windows. The shutter signal may also establish an integration time, which is the length of time that the photodiodes of each pixel cell 310 photogenerate image charge in response to incident light. In one implementation, the exposure time is set to be the same for each of the frames.

Figure 4:
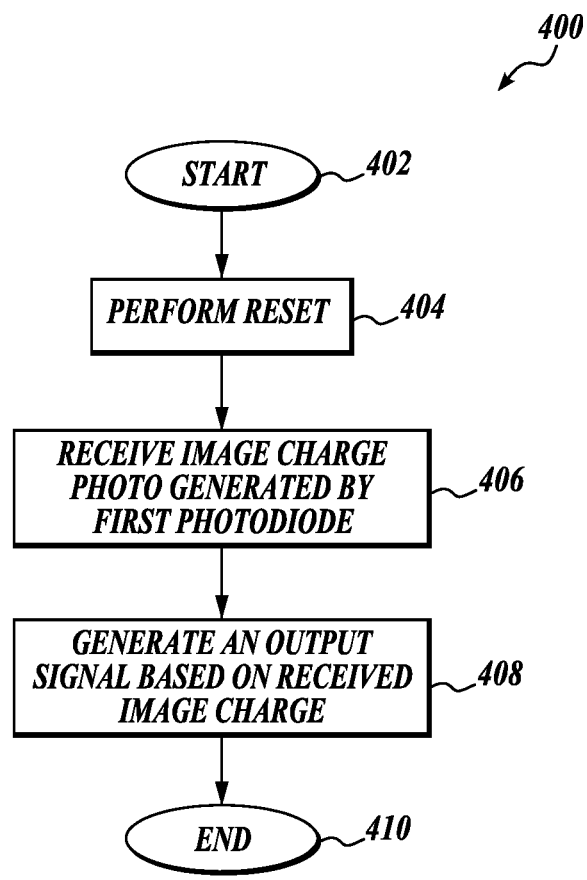
FIG. 4 is a flow diagram illustrating the operation of an exemplary pixel that has a plurality of photodiodes, including multiple large photodiodes and at least one small photodiode, and that may operate in accordance with the teachings of the present invention.

FIG. 4 shows a method 400 of operating an exemplary pixel that has a plurality of photodiodes, including one or more first photodiodes and at least one small photodiode, as well as output circuitry that may be selectively, electrically coupled to either or both of the first photodiode(s) and/or the at least one small photodiode. Method 400 begins at 402 at which the operation of the exemplary pixel may be initiated. Such initiation may occur, for example, when the exemplary pixel is powered up. Such initiation may occur after the exemplary pixel undergoes an image acquisition operation. Method 400 then transitions from 402 to 404.

At 404, the control circuitry transmits one or more signals to cause the exemplary pixel to perform a reset. As such, the control circuitry may transmit one or more signals to cause each of the transfer switches in the exemplary pixel to enter into a closed state to thereby electrically couple the first photodiode(s), the small photodiode, and floating diffusion node to reset circuitry. The reset circuitry may include a voltage source that will be used to sweep image charge from the first photodiode(s), the small photodiode(s), and floating diffusion node and thereby perform a reset operation. Such a reset operation may be used to ready the photodiodes in the exemplary pixel to photogenerate image charge and thereby generate image data for an image acquisition operation. The control circuitry may then transmit one or more signals to cause each of the transfer switches in the exemplary pixel to enter into an open state.

At 406, the output circuitry may receive image charge that may be generated at one or more of the first photodiodes. Such image charge may be received upon causing one or more of the transfer switches to selectively electrically couple one or more of the first photodiodes to the output circuitry. Such image charge may be generated when light is incident on one or more of the first photodiodes. In such an implementation, an electrical path may be present between the first photodiode(s) and the floating diffusion coupled to the output circuitry. In some instances, the image charge that is then present at the floating diffusion coupled to the output circuitry may be used to generate image data for the exemplary pixel. The first photodiode(s) collectively have a relatively large surface area, as compared to the small photodiode, that may be used to photogenerate image charge. In addition, because the exemplary pixel includes more photodiodes that comprise the first photodiodes as compared to conventional pixels, the first photodiode(s) in the exemplary pixel may be used to generate image data during low light situations. The use of additional first photodiodes to comprise the large photodiode, as compared to a conventional pixels, may also provide for improved full well capacity of the exemplary pixel. Such an increased full well capacity may reduce the instances of white pixel noise in which the exemplary pixel enters a saturated condition. In this situation, the DFD switch may remain in an open position so that the exemplary pixel operates in a high conversion gain mode.

At 408, the output circuitry may generate an output signal based on the received image charges at the floating diffusion node. For example, the output circuitry may include an output amplifier or buffer that has a source follower transistor that generates an output signal in response to the image charge in the floating diffusion node received from one or more of the first photodiode(s) and/or the small photodiode.

The method 400 ends at 410. At that point, the exemplary pixel may be used for a subsequent image acquisition operation in which, for example, example 400 may be repeated in whole or in part.

Figure 5:
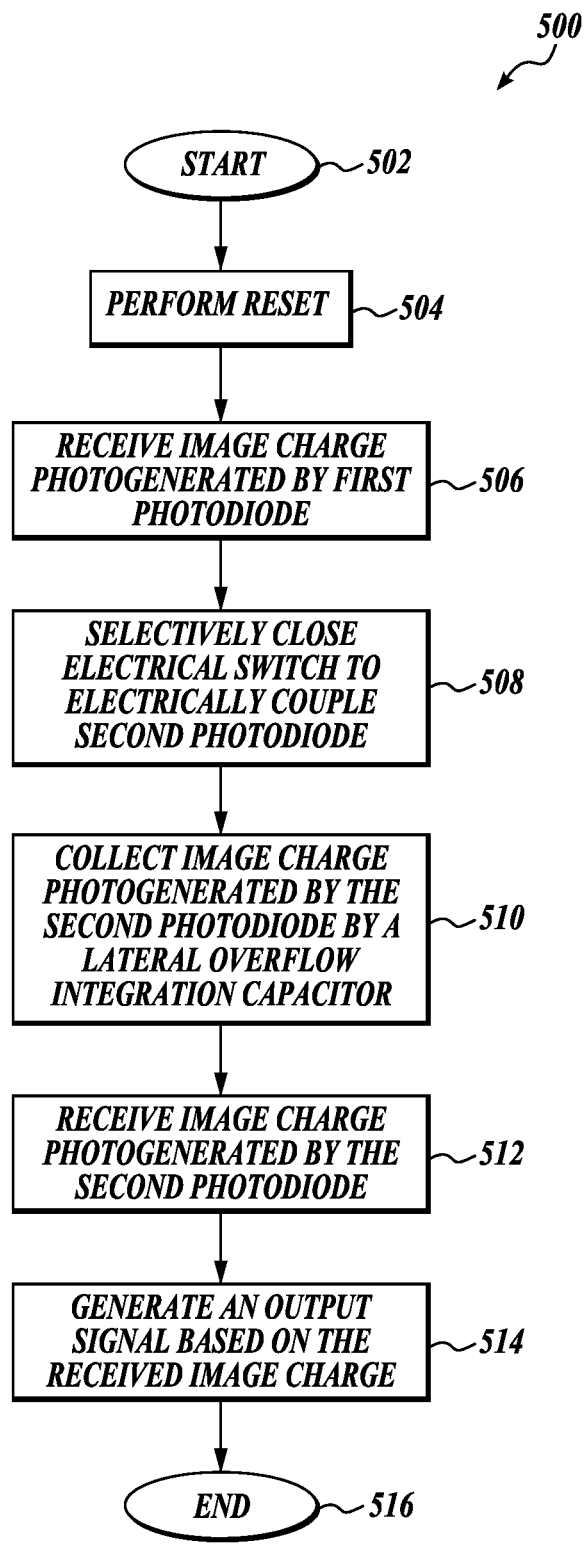
FIG. 5 is a flow diagram illustrating the operation of an exemplary pixel that has a plurality of photodiodes along with a lateral overflow integration capacitor (LOFIC) and that may operate in accordance with the teachings of the present invention.

FIG. 5 shows a method 500 of operating an exemplary pixel that has a plurality of photodiodes, including one or more first photodiodes and at least one small photodiode, output circuitry, and a floating diffusion node that may be selectively, electrically coupled to either or both of the one or more first photodiodes and/or the at least one small photodiode. The exemplary pixel may also include a lateral overflow integration capacitor (LOFIC) and that may operate in accordance with the teachings of the present invention. Method 500 begins at 502 at which the operation of the exemplary pixel may be initiated. Such initiation may occur, for example, when the exemplary pixel is powered up. Such initiation may occur after the exemplary pixel undergoes an image acquisition operation. Method 500 then transitions from 502 to 504.

At 504, the control circuitry transmits one or more signals to cause the exemplary pixel to perform a reset. As such, the control circuitry may transmit one or more signals to cause each of the transfer switches in the exemplary pixel to enter into a closed state to thereby electrically couple the first photodiode(s), the small photodiode, and floating diffusion node to reset circuitry. The reset circuitry may include a voltage source that will be used to sweep image charge from the first photodiode(s), the small photodiode(s), and floating diffusion node and thereby perform a reset operation. Such a reset operation may be used to ready the photodiodes in the exemplary pixel to photogenerate image charge and thereby generate image data for an image acquisition operation. The control circuitry may then transmit one or more signals to cause each of the transfer switches in the exemplary pixel to enter into an open state.

At 506, the floating diffusion node coupled to the output circuitry may receive image charge that may be generated at one or more of the first photodiodes. Such image charge may be generated when light is incident on one or more of the first photodiodes. In such an implementation, an electrical path may be present between one or more of the first photodiodes and the floating diffusion node coupled to the output circuitry. In some instances, the image charge that is then present at the floating diffusion node coupled to the output circuitry may be used to generate image data for the exemplary pixel. The first photodiode(s) have collectively a relatively large surface area, as compared to the small photodiode, that may be used to photogenerate image charge. In addition, because the exemplary pixel includes more first photodiodes that comprise the large photodiode, the first photodiode(s) in the exemplary pixel may be used collectively to generate image data during low light situations. The use of additional first photodiodes to comprise the large photodiode may also provide for improved full well capacity in the first photodiodes of the exemplary pixel.

At 508, control circuitry may send one or more signals that cause an electrical switch located between the small photodiode and the floating diffusion node coupled to the output circuitry to transition to a closed state, thereby establishing an electrical path between the small photodiode and the floating diffusion node coupled to the output circuitry. As a result, the small photodiode and the floating diffusion node coupled to the output circuitry will be electrically coupled such that image charge photogenerated at the small photodiode by incident light may travel from the small photodiode to the floating diffusion node output circuitry.

At 510, the LOFIC circuitry may be selectively electrically coupled to the small photodiode to capture at least some of the image charge generated at the small photodiode. Such LOFIC circuitry may include a capacitor that is electrically coupled on one side to the small photodiode and on the other side to a voltage source. By energizing the voltage source, the LOFIC circuitry may be used to capture at least some of the image charge generated by the small photodiode. Such image charge that is collected by the LOFIC circuitry may not be further transmitted to other components of the exemplary pixel while the LOFIC voltage source is energized. Accordingly, by reducing the image charge that is received at the output circuitry, the LOFIC circuitry may be used to increase the dynamic range of the exemplary pixel.

At 512, the floating diffusion node coupled to the output circuitry receives image charge photogenerated at the small photodiode. Because the small photodiode has a relatively small surface area for receiving incident light, as compared to the first photodiode(s) collectively, the exposure time of the small photodiode may be increased to provide image data for bright flashes of light such as LED flickers that are incident on the exemplary pixel and prevent the occurrence of a white pixel condition.

At 514, the output circuitry may generate an output signal based on the received image charges. For example, the output circuitry may include an output amplifier or buffer that has a source follower transistor that generates an output signal in response to the image charge received from one or more of the first photodiode(s) and/or the small photodiode.

The method 500 ends at 516. At that point, the exemplary pixel may be used for a subsequent image acquisition operation in which, for example, example 500 may be repeated in whole or in part.

Figure 6:
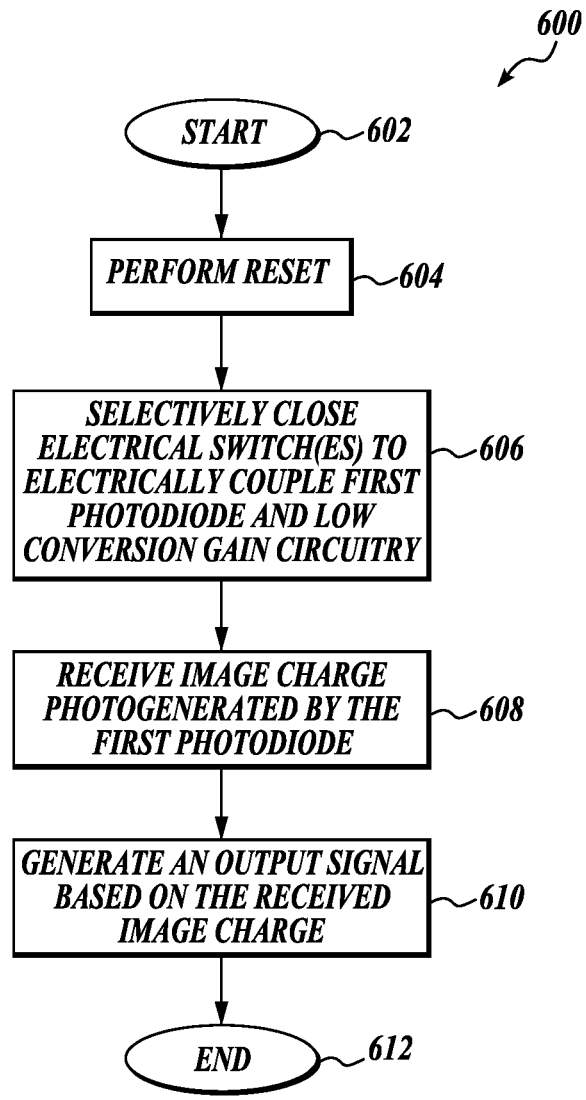
FIG. 6 is a flow diagram illustrating the operation of an exemplary pixel that has a plurality of photodiodes along with low conversion gain circuitry and that may operate in accordance with the teachings of the present invention.

FIG. 6 shows a method 600 of operating an exemplary pixel that has a plurality of photodiodes, including one or more first photodiodes and at least one small photodiode, as well as output circuitry that may be selectively, electrically coupled to either or both of the first photodiode(s) and/or the at least one small photodiode. Method 600 begins at 602 at which the operation of the exemplary pixel may be initiated. Such initiation may occur, for example, when the exemplary pixel is powered up. Such initiation may occur after the exemplary pixel undergoes an image acquisition operation. Method 600 then transitions from 602 to 604.

At 604, the control circuitry transmits one or more signals to cause the exemplary pixel to perform a reset. As such, the control circuitry may transmit one or more signals to cause each of the transfer switches in the exemplary pixel to enter into a closed state to thereby electrically couple the first photodiode(s), the small photodiode, and floating diffusion node to reset circuitry. The reset circuitry may include a voltage source that will be used to sweep image charge from the first photodiode(s), the small photodiode(s), and floating diffusion node and thereby perform a reset operation. Such a reset operation may be used to ready the photodiodes in the exemplary pixel to photogenerate image charge and thereby generate image data for an image acquisition operation. The control circuitry may then transmit one or more signals to cause each of the transfer switches in the exemplary pixel to enter into an open state.

At 606, the control circuitry transmits one more signals to cause the transfer switches associated with the first photodiodes to close and to cause a DFD switch to close to thereby electrically couple the first photodiodes with a low conversion gain circuitry, such as at least one dual conversion gain capacitor, which increases the FWC of the floating diffusion node. By closing the DFD switch, the low conversion gain circuitry may be selectively, electrically coupled to receive image charge photogenerated at the first photodiodes. As such, the exemplary pixel may be in a low conversion gain mode when the DFD switch is closed. The switches that are closed as part of 606 may further form an electrical pathway between the first photodiodes, the dual conversion gain capacitor, and output circuitry.

At 608, image charge may be received at the floating diffusion node coupled to the output circuitry. Such image charge may be generated when light is incident on one or more of the first photodiodes. In such an implementation, an electrical path may be present between the first photodiode (s) and the floating diffusion node coupled to the output circuitry. In some instances, the image charge that is then present at the floating diffusion node coupled to the output circuitry may be used to generate image data for the exemplary pixel. The first photodiode(s) collectively have a relatively large surface area, as compared to the small photodiode, that may be used to photogenerate image charge. In addition, because the exemplary pixel includes more first photodiodes that comprise the large photodiode, the first photodiodes in the exemplary pixel may be used to generate image data during low light situations. The use of additional first photodiodes to comprise the large photodiode, may also provide for improved full well capacity of the exemplary pixel. Such an increased full well capacity may reduce the instances of white pixel noise in which the exemplary pixel enters a saturated condition.

At 610, the output circuitry may generate an output signal based on the received image charges at the floating diffusion node. For example, the output circuitry may include an output amplifier or buffer that has a source follower transistor that generates an output signal in response to the image charge received at the floating diffusion node from one or more of the first photodiode(s) and/or the small photodiode.

The method 600 ends at 612. At that point, the exemplary pixel may be used for a subsequent image acquisition operation in which, for example, example 600 may be repeated in whole or in part.

Figure 7:
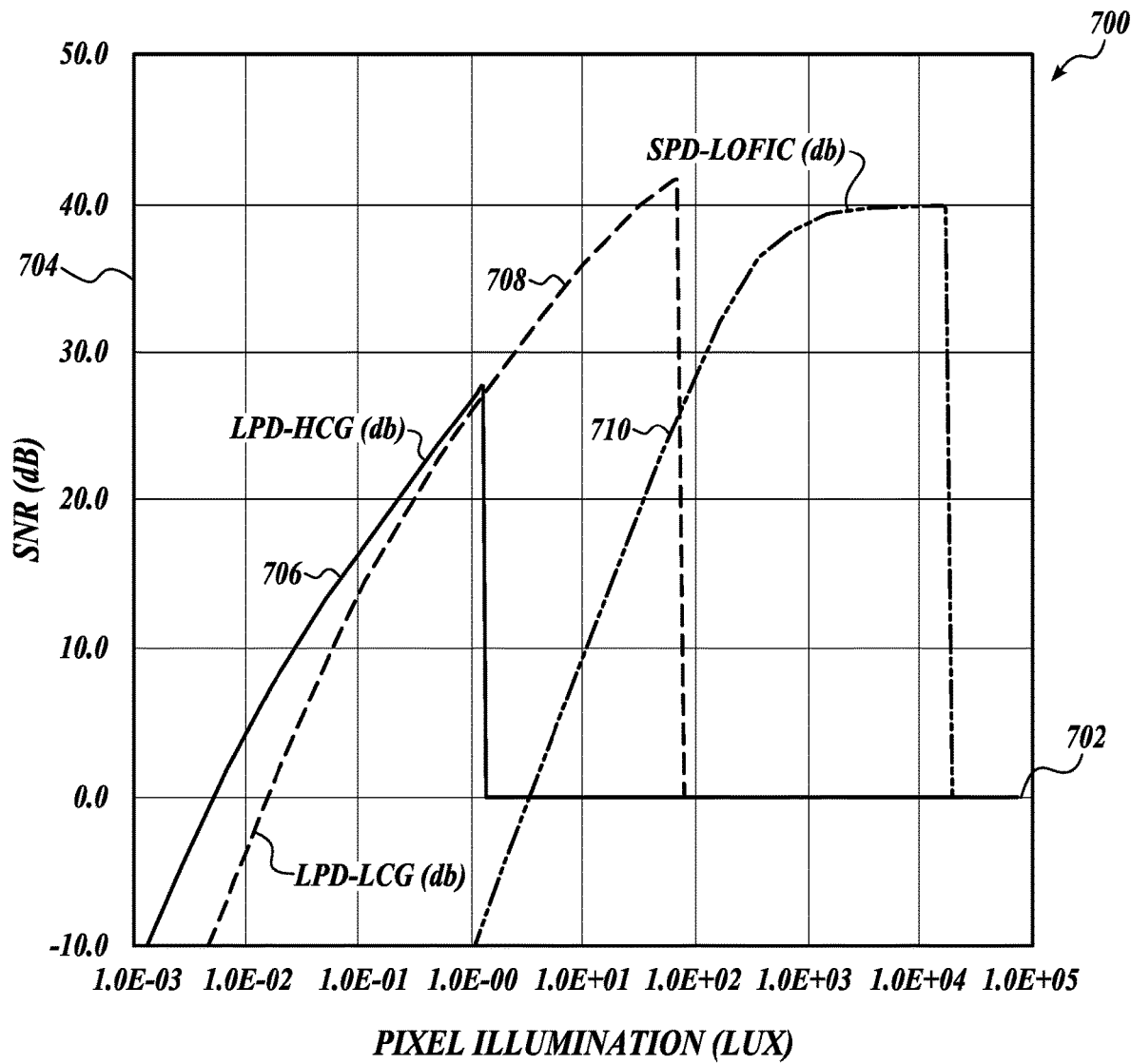
FIG. 7 is a signal-to-noise ratio (SNR) diagram illustrating the dynamic range of an exemplary pixel in that operates in accordance with the teachings of the present invention.

FIG. 7 is a signal-to-noise ratio (SNR) diagram 700 illustrating the dynamic range of an exemplary pixel in that operates in accordance with the teachings of the present invention. The exemplary pixel includes a 3×3 layout of photodiodes in which a small photodiode is positioned in the middle of the array and is surrounded by 8 first photodiodes that collectively may form a large photodiode. The exemplary pixel also includes LOFIC circuitry that is selectively electrically coupled to the small photodiode.

The x-axis 702 of SNR diagram 700 represents the illumination on the exemplary pixel and is provided in lux. The y-axis 704 of the SNR diagram 700 represents the signal-to-noise ratio in decibels. The first plot 706 shows the SNR response of the large photodiode having high conversion gain as the intensity of the pixel illumination from the incident light increases moving rightward along the x-axis. As seen in SNR diagram 700, the large photodiode having high conversion gain provide an output signal until the lux exceeds about 1.0E+0.0 with a maximum signal-to-noise ratio of about 28 dB. The second plot 708 shows the SNR response of the large photodiode having low conversion gain as the intensity of the pixel illumination from the incident light increases moving rightward along the x-axis. The large photodiode having low conversion gain provides an output signal until just before 1.0E+02 with a maximum signal-to-noise ratio of about 42 dB. The third plot 710 shows the SNR response of the small photodiode that is electrically coupled to the LOFIC circuitry. Such a small photodiode provides an output signal until the lux for the pixel illumination exceeds about 1.0E+04 with a maximum signal-to-noise ratio of about 40 dB. The total dynamic range of the exemplary pixel may be based on the dual conversion gain of the large photodiode, the output of the small photodiode, and the output when the exemplary pixel performs a VS Exposure. Accordingly, the exemplary node that provides the output graphed in SNR diagram 700 may have a dynamic range of about 130.6 dB.

The above descriptions of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A pixel, comprising:
an array of a plurality of photodiodes, the array of photodiodes which includes a plurality of rows of photodiodes and a plurality of columns of photodiodes, the plurality of photodiodes which includes a set of first photodiodes that has a first surface area and at least one second photodiode that has a second surface area that is smaller than the first surface area, wherein the first surface area of the set of first photodiodes is arranged symmetrically around the second surface area of the at least one second photodiode along at least a first axis of symmetry and a second axis of symmetry;
a floating diffusion node selectively coupled to receive image charge from the first set of photodiodes or the at least one second photodiode;
output circuitry that is electrically coupled to the floating diffusion node;
a switch that is selectively, operably closed to electrically couple the floating diffusion node to the at least one second photodiode;
one or more dual floating diffusion (DFD) switches to electrically couple the set of first photodiodes to low conversion gain circuitry, wherein the pixel is in a high conversion gain state when the one or more DFD switches are open, wherein the pixel is in a low conversion gain state when the one or more DFD switches are closed, and wherein the low conversion gain circuitry is coupled between the set of first photodiodes and the floating diffusion node; and
a lateral overflow integration capacitor coupled between the at least one second photodiode and the floating diffusion node.

2. The pixel of claim 1, wherein the plurality of rows includes at least three rows, and the plurality of columns includes at least three columns.

3. The pixel of claim 1, further comprising:
reset circuitry that includes a reset switch, the reset switch which is selectively, operably closed to electrically couple a reset node to each of the first photodiodes in the set of first photodiodes and the at least one second photodiode, the reset node which sweeps the image charge photogenerated from each of the first photodiodes in the set of first photodiodes and the at least one second photodiode.

4. The pixel of claim 1 wherein the lateral overflow integration capacitor is selected from the group consisting of a large in metal capacitor, a metal stacked capacitor, and a metal-to-metal capacitor.

5. The pixel of claim 1, further comprising:
a first optical filter that is positioned on an outside facing surface of the set of first photodiodes, the first optical filter which filters incident light that is within a first range of wavelengths.

6. The pixel of claim 5, further comprising:
a second optical filter that is positioned on an outside facing surface of the at least one second photodiode, the second optical filter which filters incident light that is within a second range of wavelengths where the second range may be identical to the first range.

7. The pixel of claim 1, wherein the output circuitry includes an output amplifier to generate an output signal, the output amplifier which is selectively, electrically coupled to each of the first photodiodes in the set of first photodiodes and to the at least one second photodiode.

8. The pixel of claim 1, wherein the set of first photodiodes includes at least eight photodiodes included in the plurality of photodiodes arranged symmetrically around the at least one second photodiode.

9. The pixel of claim 1, wherein the plurality of photodiodes have at least one of a common shape or a common size.

10. The pixel of claim 1, wherein the first axis of symmetry is orthogonal to the second axis of symmetry.

11. The pixel of claim 10, wherein the first set of photodiodes includes at least two diagonal photodiodes, each disposed between the first axis of symmetry and the second axis of symmetry.

12. The pixel of claim 1, further comprising an enable switch coupled between the floating diffusion node and the lateral overflow integration capacitor.

13. A method for generating an output signal based on light incident on a pixel in which the pixel is comprised of an array of a plurality of photodiodes, the method comprising:
receiving, at an output circuitry and from a floating diffusion node, image charge photogenerated by each of first photodiodes included in a set of first photodiodes of the array of the plurality of photodiodes, the array of photodiodes which includes a plurality of rows of photodiodes and a plurality of columns of photodiodes, the plurality of photodiodes which includes the set of first photodiodes that has a first surface area, the plurality of photodiodes which includes at least one second photodiode that has a second surface area that is smaller than the first surface area, wherein the first surface area of the first set of photodiodes is arranged symmetrically around the second surface area of the at least one second photodiode along at least a first axis of symmetry and a second axis of symmetry, wherein said each of the first photodiodes in the set of first photodiodes is electrically coupled to the output circuitry;
selectively closing an electrical switch to electrically couple the at least one second photodiode with the output circuitry, and when the electrical switch is selectively closed, receiving, at the output circuitry and from the floating diffusion node, image charge photogenerated by the at least one second photodiode;
selectively closing one or more dual floating diffusion (DFD) switches to electrically couple the set of first photodiodes to low conversion gain circuitry, wherein the pixel is in a high conversion gain state when the one or more DFD switches are open and wherein the pixel is in a low conversion gain state when the one or more DFD switches are closed, and wherein the low conversion gain circuitry is coupled between the set of first photodiodes and the floating diffusion node;
collecting at least some of the image charge photogenerated by light incident on the at least one second photodiode using a lateral overflow integration capacitor coupled between the at least one second photodiode and the floating diffusion node; and
generating the output signal based upon the image charge received at the output circuitry.

14. The method of claim 13, further comprising:
selectively closing a reset switch to electrically couple a reset node to each of the first photodiodes in the set of first photodiodes and the at least one second photodiode, and when the reset switch is selectively closed, sweeping the image charge from each of the first photodiodes in the set of first photodiodes and the at least one second photodiode to the reset node.

15. The method of claim 13, wherein the output circuitry includes an output amplifier to generate the output signal, wherein said receiving, at the output circuitry, the image charge photogenerated by each of the first photodiodes in the set of first photodiodes and by the second photodiode further comprises receiving the image charge at the output amplifier.

16. A high dynamic range imaging system, comprising:
an array of pixels, wherein each pixel in the array of pixels includes:
an array of a plurality of photodiodes, the array of photodiodes which includes a plurality of rows of photodiodes and a plurality of columns of photodiodes, the plurality of photodiodes which includes a set of first photodiodes that has a first surface area and at least one second photodiode that has a second surface area that is smaller than the first surface area, wherein the first surface area of the first set of photodiodes is arranged symmetrically around the second surface area of the at least one second photodiode along at least a first axis of symmetry and a second axis of symmetry;
a floating diffusion node selectively coupled to receive image charge from the first set of photodiodes or the at least one second photodiode;
output circuitry that is electrically coupled to the floating diffusion node;
a switch that is selectively, operably closed to electrically couple the floating diffusion node to the at least one second photodiode;
one or more dual floating diffusion (DFD) switches to electrically couple the set of first photodiodes to low conversion gain circuitry, wherein the pixel is in a high conversion gain state when the one or more DFD switches are open, wherein the pixel is in a low conversion gain state when the one or more DFD switches are closed, and wherein the low conversion gain circuitry is coupled between the set of first photodiodes and the floating diffusion node; and
a lateral overflow integration capacitor coupled between the at least one second photodiode and the floating diffusion node;
control circuitry which is electrically coupled to the array of pixels to control operation of the array of pixels; and
readout circuitry which is electrically coupled to the array of pixels to receive output signals from the array of pixels, the readout circuitry which converts the received output signals to image data.

17. The high dynamic range imaging system of claim 16, wherein the plurality of rows for each pixel in the array of pixels includes at least three rows, and the plurality of columns for each pixel in the array of pixels includes at least three columns.

18. The high dynamic range imaging system of claim 16, wherein each pixel in the array of pixels further comprises:
reset circuitry that includes a reset switch, the reset switch which is selectively, operably closed to electrically couple a reset node to each of the first photodiodes in the set of first photodiodes and the at least one second photodiode, the reset node which sweeps the image charge from each of the first photodiodes in the set of first photodiodes and the at least one second photodiode.

19. The high dynamic range imaging system of claim 16 wherein the output circuitry for each pixel in the array of pixels includes an output transfer gate, the output transfer gate which is selectively, electrically coupled to each of the first photodiodes in the set of first photodiodes and to the at least one second photodiode.

20. The method of claim 13, wherein an enable switch is coupled between the floating diffusion node and the lateral overflow integration capacitor.

21. A method for generating an output signal based on light incident on a pixel in which the pixel is comprised of an array of a plurality of photodiodes, the method comprising:
- generating image charge photogenerated by each of first photodiodes included in a set of first photodiodes of the array of the plurality of photodiodes, the array of photodiodes which includes a plurality of rows of photodiodes and a plurality of columns of photodiodes, the plurality of photodiodes which includes the set of first photodiodes that has a first surface area;
- generating image charge photogenerated by at least one second photodiode that is included within the plurality of photodiodes, the at least one second photodiode which has a second surface area that is smaller than the first surface area, wherein the first surface area of the first set of photodiodes is arranged symmetrically around the second surface area of the at least one second photodiode along at least a first axis of symmetry and a second axis of symmetry;
- selectively closing one or more dual floating diffusion (DFD) switches to electrically couple the set of first photodiodes to low conversion gain circuitry, wherein the pixel is in a high conversion gain state when the one or more DFD switches are open and wherein the pixel is in a low conversion gain state when the one or more DFD switches are closed, wherein the low conversion gain circuitry is coupled between the set of first photodiodes and the floating diffusion node;
- collecting at least some of the image charge photogenerated by light incident on the at least one second photodiode using a lateral overflow integration capacitor coupled between the at least one second photodiode and the floating diffusion node; and
- receiving the image charge from at least one of the set of first photodiodes and the at least one second photodiode at the output circuitry; and
- generating the output signal based upon the image charge received at the output circuitry.

22. The method of claim 21, further comprising:
selectively closing a reset switch to electrically couple a reset node to each of the first photodiodes in the set of first photodiodes and the at least one second photodiode, and when the reset switch is selectively closed, sweeping the image charge from each of the first photodiodes in the set of first photodiodes and the at least one second photodiode to the reset node.

23. The method of claim 21, wherein the output circuitry includes an output amplifier to generate the output signal, wherein said receiving, at the output circuitry, the image charge photogenerated by each of the first photodiodes in the set of first photodiodes and by the at least one second photodiode further comprises receiving the image charge at the output amplifier.

24. The high dynamic range imaging system of claim 16, wherein each pixel in the array of pixels further comprises an enable switch coupled between the floating diffusion node and the lateral overflow integration capacitor.

* * * * *

UNITED STATES PATENT AND TRADEMARK OFFICE
CERTIFICATE OF CORRECTION

| | |
|---|---|
| PATENT NO. | : 11,451,717 B2 |
| APPLICATION NO. | : 16/674964 |
| DATED | : September 20, 2022 |
| INVENTOR(S) | : Solhusvik |

It is certified that error appears in the above-identified patent and that said Letters Patent is hereby corrected as shown below:

In the Claims

| Column | Line | |
|---|---|---|
| 14 | 20 | change "the first set of photodiodes" to -- the set of first photodiodes -- |
| 14 | 64 | change "second range may be identical to the first range" to -- second range of wavelengths may be identical to the first range of wavelengths -- |
| 15 | 13 | change "the first set of photodiodes" to -- the set of first photodiodes -- |
| 15 | 35 | change "the first set of photodiodes" to -- the set of first photodiodes -- |
| 16 | 20 | change "the first set of photodiodes is" to -- the set of first photodiodes is -- |
| 16 | 26 | change "the first set of photodiodes or" to -- the set of first photodiodes or -- |
| 17 | 23 | change "the first set of photodiodes" to -- the set of first photodiodes -- |

Signed and Sealed this
Eighteenth Day of July, 2023

Katherine Kelly Vidal
*Director of the United States Patent and Trademark Office*